United States Patent Office 3,573,221
Patented Mar. 30, 1971

3,573,221
THERMOLUMINESCENT LITHIUM BORATE
Robert Thompson Brunskill, Cumberland, England, assignor to United Kingdom Atomic Energy Authority, London, England
Filed Nov. 30, 1967, Ser. No. 686,887
Claims priority, application Great Britain, Dec. 14, 1966, 56,019/66; Aug. 4, 1967, 37,330/67
Int. Cl. C09k *1/66;* G01t *1/11*
U.S. Cl. 252—301.4
6 Claims

ABSTRACT OF THE DISCLOSURE

A process for the manufacture of thermoluminescent lithium borate in which lithium tetraborate is doped with manganese and the doped lithium tetraborate is melted and resolidified in an argon atmosphere.

BACKGROUND OF THE INVENTION

This invention relates to thermoluminescent lithium borate.

Lithium borate has been proposed as a possible thermoluminescent material for use in dosimetry because of its good tissue equivalent properties but it has hitherto suffered from the disadvantage that its sensitivity to beta-gamma radiation is low compared with that of lithium fluoride which is at present extensively used in the field of radiological protection. The present invention seeks to provide thermoluminescent lithium borate having an improved sensitivity.

SUMMARY OF THE INVENTION

According to the invention in the manufacture of thermoluminescent lithium borate lithium tetraborate is doped with manganese and the doped lithium borate is melted and resolidified in an argon atmosphere.

Figure 1:
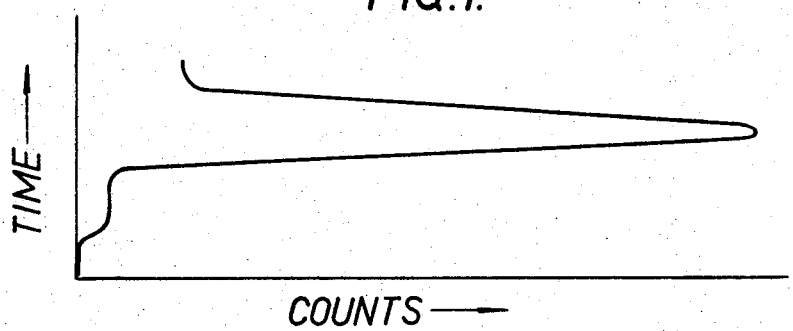
Figure 2:
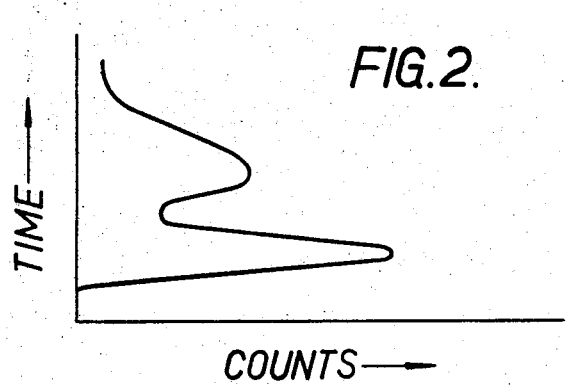
Figure 3:
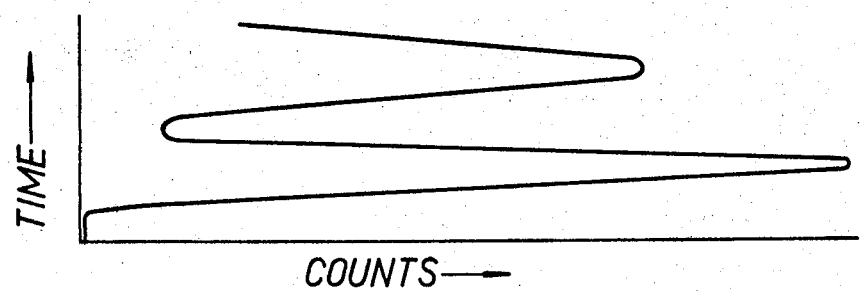

FIGS. 1, 2 and 3 show glow curves obtained from lithium fluoride, commercially available lithium borate and lithium borate of this invention, respectively.

DESCRIPTION OF THE PREFERRED EMBODIMENTS

In one way of carrying the invention into effect thermoluminescent lithium borate is prepared in the following manner:

Example 1

Lithium tetraborate powder is mixed to a paste with manganese chloride solution having a concentration of 10 gms. manganese/litre. The proportions are 20 g. of borate ($Li_2B_4O_7 \cdot 5H_2O$) and 2 ml. of solution. The paste is dried in an oven and the powder thoroughly mixed. The mixture is placed in a pure graphite crucible and melted by heating to 1,000° C. in a furnace with an argon atmosphere. The furnace is allowed to cool to 700° C. before removing the crucible and lithium borate. The lithium borate is partly devitrified on cooling, the devitrification being completed by subsequently heating to 650° C. in argon for half an hour and then cooling in argon. The billet so formed is ground to 100–200 Tyler mesh size and washed in water and acetone.

Sensitivity can be further improved (up to 40%) by curing the powder in air at about 400° C. for about 6 hours. With different batches some variation has been found in the curing time for optimum sensitivity. The best way of determining this is by experiment on small samples of the batch. The sensitivity of a batch prepared by the above method is dependent on the source of lithium borate. In an alternative method of preparation lithium carbonate and boric acid are mixed with manganese as chloride in molecular proportions to form lithium tetraborate as follows:

Example 2

Lithium carbonate (29.56 g.) and boric acid (98.96 g.) are mixed in a polythene beaker with 100 mg. of manganese as the chloride in solution. Water is added to form a thin paste and the mixture is stirred continuously while reaction proceeds. The beaker and contents are then dried in an oven at 90° C. When the mixture has dried it is crushed to a fine powder and divided into four aliquots which are each placed in a graphite crucible and introduced to an oven at 400° C. with an argon purge. The temperature is raised to 1000° C. and held there for half an hour. The oven is switched off, the argon purge maintained. The oven and contents are allowed to cool naturally until oven is at 670° C. The graphite crucible and contents are removed and allowed to cool in air.

The billet produced is usually completely devitrified and is ready for use after grinding and washing in water and acetone. If devitrification is not complete grinding is difficult and the product is less sensitive. Complete devitrification may however be achieved by the separate step of reheating the billet to 650° C. in an argon atmosphere before grinding and washing.

The product of this second example does not require curing to improve its sensitivity. Its sensitivity is indicated by the accompanying graphs which show glow curves obtained from lithium fluoride (FIG. 1) commercially available lithium borate (FIG. 2) and lithium borate prepared in accordance with the invention (FIG. 3) after exposure of each to a thallium source for one minute and reading out under identical conditions. In the graphs counts are plotted against heating time, the temperature increasing with time.

For the measurement of radiation does using lithium borate in accordance with the invention a temperature range of 150–300° C. is preferred. Examples of the simple apparatus required for measuring the amount of light emitted during the heating is given in Nuclear Engineering, November 1966, pages 875 to 877. It should be noted, however, that the article is mainly concerned with the use of lithium fluoride as the thermoluminescent material. Lithium fluoride emits a blue light (4400 A.) whereas lithium borate emits an orange light (6050 A.). It is therefore advisable to use with lithium borate a photomultiplier tube with a good response to orange light.

After exposure to radiation and subsequent heating to determine the radiation dose received thermoluminescent lithium borate prepared in the manner described above may be re-used without further treatment. In this respect, the lithium borate shows a marked advantage over lithium fluoride which required careful heat treatment before re-use.

I claim:
1. In the manufacture of thermoluminescent lithium borate a process in which lithium tetraborate is doped with manganese and the doped lithium tetraborate is melted and resolidified in an argon atmosphere.

2. A process as claimed in claim 1 wherein the doped lithium tetraborate is melted and resolidified in a graphite 3. A process as claimed in claim 1 wherein the lithium tetraborate is doped by mixing molecular proportions of lithium carbonate and boric acid with manganese as the chloride and heating the resultant mixture.

4. A process as claimed in claim 1 wherein the resolidified manganese doped lithium tetraborate is heated and cooled in an argon atmosphere to effect complete devitrification.

5. A process as claimed in claim 4 wherein the devitrified manganese doped lithium tetraborate is cured in air.

6. Thermoluminescent lithium borate prepared by the process claimed in claim 1.

References Cited

UNITED STATES PATENTS

| | | | |
|---|---|---|---|
| 3,014,877 | 12/1961 | Ranby et al. | 252—301.4 |
| 3,320,180 | 5/1967 | Swinehart | 252—301.4 |
| 3,413,235 | 11/1968 | Jones et al. | 252—301.4 |

OTHER REFERENCES

Gorbics, "Nuclear Science Abstracts," vol. 20, No. 22, Nov. 30, 1966.

Mejdahl, "Nuclear Science Abstracts," vol. 21, No. 4, Feb. 28, 1967.

TOBIAS E. LEVOW, Primary Examiner

J. COOPER, Assistant Examiner

U.S. Cl. X.R.

250—71.5, 83